G. M. TITUS.
Hand-Truck.
No. 216,770. Patented June 24, 1879.
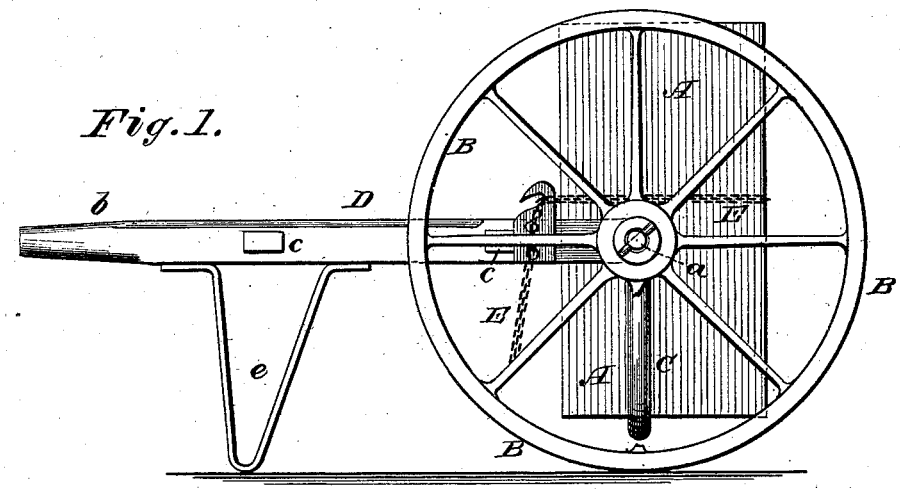
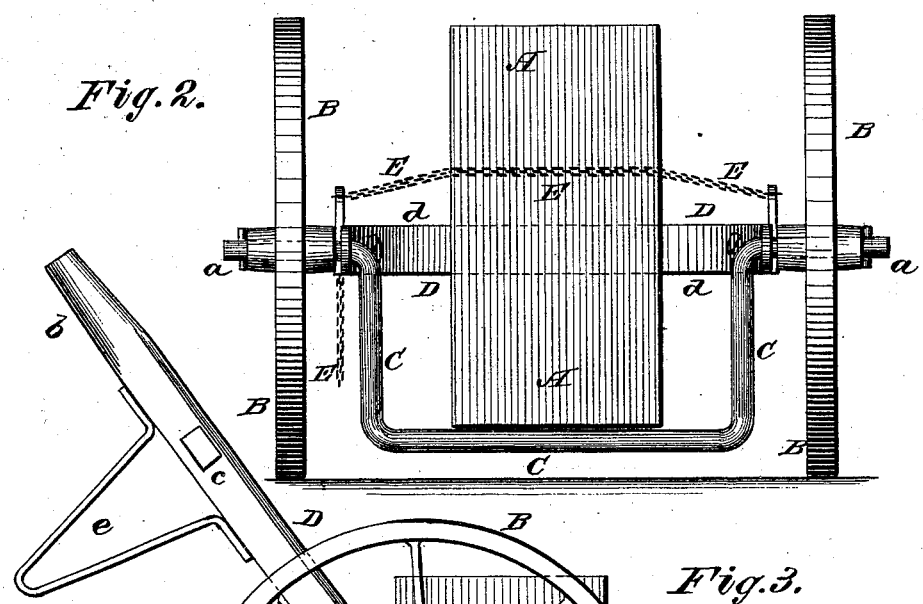
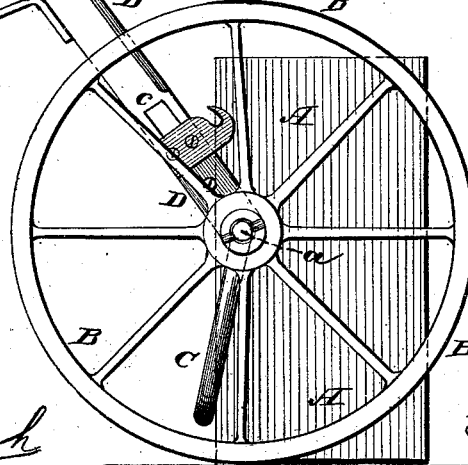
Witnesses,
P. C. Dietrich
Frank H. Duffy
Inventor
George M. Titus.
Per Manahan & Ward, Attorneys.

UNITED STATES PATENT OFFICE.

GEORGE M. TITUS, OF ROCK FALLS, ILLINOIS, ASSIGNOR OF ONE-HALF HIS RIGHT TO W. W. BROWN, OF SAME PLACE.

IMPROVEMENT IN HAND-TRUCKS.

Specification forming part of Letters Patent No. 216,770, dated June 24, 1879; application filed April 18, 1879.

*To all whom it may concern:*

Be it known that I, GEORGE M. TITUS, of Rock Falls, in the county of Whiteside and State of Illinois, have invented certain new and useful Improvements in Trucks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has reference to an improvement in trucks, and the two substantial points attained are, first, the transportation of articles in nearly or quite a perpendicular position; and, second, securing such articles on the truck without throwing any material part of the weight thereof upon the handles.

Figure 1 is a side elevation of my invention, with the block A thereon in position for transportation. Fig. 2 is a front view of the truck. Fig. 3 is a side view of the truck in position of being loaded, the handles being elevated nearly to the perpendicular.

A is a block representing the article to be moved. B B are ordinary carrying-wheels, revolving on the spindles *a a* of the axle C. The axle C is bent downward near the inner end of the hubs of the wheels B B, as shown, so that the main portion of the axle is suspended but slightly above the lower part of the wheels, parallel with the ground or floor. As the center of gravity of the axle C is much below the center of the carrying-wheels, the axle remains suspended near the floor or ground, and is readily oscillated backward and forward.

D is a frame, consisting of the handles *b b*, cross-braces *c c*, front circular brace, *d*, and legs *e e*. The frame D is pivoted at its two front corners to the axle C, contiguous to the inside of the hubs of the carrying-wheels B B.

E is a chain attached to the side of the frame D a short distance behind one of the carrying-wheels, and adapted to pass around in front of the weight to be moved and to be fastened to a hook on the other side of the frame D, in the rear of the hub of the other wheel.

The mode of operation is as follows: The front end of the truck is moved up against the article to be loaded. The frame D is then raised from the rear to nearly the perpendicular. The operator then puts his hand through between the braces *c c* of the frame D and tilts the article to be loaded slightly forward. In placing the truck against the intended load, the axle C is pushed backward from the perpendicular, and when the load is tilted as aforesaid the axle swings under it of its own gravity, or may be pushed under by the foot of the operator. The chain E is then passed around the front of the load and fastened on the hook on the right side of the frame D. The frame D is then brought down to its original position, and in its descent, by means of the chain E, the entire load is drawn over and on the axle C, in which position the load is ready for being moved.

By reason of the axle C readily turning in the hubs of the carrying-wheels, it and its superincumbent load remain vertical, and thus those articles—such as barrels of water, barrels of apples or potatoes, &c.—which require it are retained in a perpendicular position. As a necessary consequence of such perpendicular position, the weight of the load is practically all on the axle C, and thus the handles *b b*, and therefore the arms of the operator, are relieved of such weight.

As the frame D acts as a lever in hoisting the load, it is apparent that a heavy weight may be loaded with comparatively slight effort.

By reason of the downward bend of the axle C, carrying-wheels of any desired height may be used, and thus the same truck may be adapted for use either on a floor or the ground; and by reason of its higher wheels, it may be more easily drawn or pushed than the ordinary low-wheeled truck.

My invention is adapted to transport barrels of all kinds, whether open or shut, boxes, bales, stoves, or any article of sufficient size or weight to require a truck in its movement.

What I claim as my invention, and desire to secure by Letters Patent, is—

1. In a truck, the axle C, suspended below and adapted to oscillate independently of the frame D, substantially as shown, and for the purpose described.

2. The frame D, in combination with the axle C, when the latter is suspended independently of such frame, so as to form a secondary platform, while the former retains the horizontal position and serves to steady the load, substantially as and for the purpose specified.

3. The wheels B B and chain E, or its equivalent, in combination with the frame D and independently-oscillating axle C, whereby the load is taken up and carried in an upright position, in the manner shown, and for the purpose mentioned.

In testimony that I claim the foregoing I have hereunto set my hand this 11th day of April, 1879.

GEO. M. TITUS.

Witnesses:
MARTIN H. KREIDER,
JNO. J. CUSHING.